United States Patent
Kiya et al.

(10) Patent No.: US 7,812,902 B2
(45) Date of Patent: Oct. 12, 2010

(54) LIQUID CRYSTAL PANEL AND LIQUID CRYSTAL DISPLAY APPARATUS

(75) Inventors: Yoshiyuki Kiya, Osaka (JP); Shuuji Yano, Osaka (JP); Kenji Yoda, Osaka (JP); Kentarou Kobayashi, Osaka (JP); Masatoshi Tomonaga, Osaka (JP); Shouhei Maezawa, Osaka (JP); Yusuke Toyama, Osaka (JP)

(73) Assignee: Nitto Denko Corporation, Ibaraki-shi (JP)

( * ) Notice: Subject to any disclaimer, the term of this patent is extended or adjusted under 35 U.S.C. 154(b) by 419 days.

(21) Appl. No.: 12/089,805

(22) PCT Filed: Mar. 20, 2007

(86) PCT No.: PCT/JP2007/055618
§ 371 (c)(1),
(2), (4) Date: Apr. 10, 2008

(87) PCT Pub. No.: WO2007/122941
PCT Pub. Date: Nov. 1, 2007

(65) Prior Publication Data
US 2010/0157205 A1   Jun. 24, 2010

(30) Foreign Application Priority Data
Apr. 25, 2006 (JP) .............................. 2006-120010

(51) Int. Cl.
*G02F 1/1335* (2006.01)
(52) U.S. Cl. .............................. 349/96; 349/1; 349/139; 349/193
(58) Field of Classification Search ............... 349/96, 349/16, 9, 1, 56, 57, 58, 139, 122, 138, 193, 349/194
See application file for complete search history.

(56) References Cited

U.S. PATENT DOCUMENTS

| 7,126,754 B2* | 10/2006 | Yamaoka et al. | 359/485 |
| 2005/0117217 A1* | 6/2005 | Yamaoka et al. | 359/483 |
| 2007/0092662 A1* | 4/2007 | Matsuno et al. | 428/1.3 |

(Continued)

FOREIGN PATENT DOCUMENTS

JP    09-269504 A    10/1997

(Continued)

OTHER PUBLICATIONS

International Search Report of PCT/JP2007/055618, date of mailing Jun. 5, 2007.

*Primary Examiner*—Brian M Healy
(74) *Attorney, Agent, or Firm*—Westerman, Hattori, Daniels & Adrian, LLP (57) ABSTRACT

There is provided a liquid crystal panel and a liquid crystal display apparatus in which light leakage occurring from a peripheral portion of a screen is small, and which has excellent display uniformity in a high humidity environment.

A liquid crystal panel according to an embodiment of the present invention includes: a liquid crystal cell; a first polarizing plate placed on a viewer side of the liquid crystal cell; and a second polarizing plate placed on an opposite side of the viewer side of the liquid crystal cell, wherein a dimensional change ratio ($C_1$) of the first polarizing plate is larger than a dimensional change ratio ($C_2$) of the second polarizing plate.

14 Claims, 5 Drawing Sheets

U.S. PATENT DOCUMENTS

2008/0151374 A1* 6/2008 Sugino et al. ............... 359/500
2010/0157205 A1* 6/2010 Kiya et al. .................... 349/96

FOREIGN PATENT DOCUMENTS

| JP | 2002-129123 A | 5/2002 |
| JP | 2005-345990 A | 12/2005 |
| JP | 2006-030758 A | 2/2006 |

\* cited by examiner

LIQUID CRYSTAL PANEL AND LIQUID CRYSTAL DISPLAY APPARATUS

TECHNICAL FIELD

The present invention relates to a liquid crystal panel and a liquid crystal display apparatus having a polarizing plate with a dimensional change ratio adjusted.

BACKGROUND ART

A liquid crystal display apparatus (which is also referred to as LCD) is used for a personal computer, a television, and the like. Recently, the screen of the liquid crystal display apparatus used in these applications is being enlarged. The LCD generally uses a liquid crystal panel, in which polarizing plates are arranged on both sides of a liquid crystal cell, and can display a black image under no voltage application, for example, in a normally black mode (e.g., see Patent Document 1). However, when a conventional liquid crystal panel is subjected to an acceleration test in a high humidity environment, there is a problem that light leakage occurs from a peripheral portion of a screen in the case where a black image is displayed. Such a problem is more serious in a larger screen. Therefore, there is a demand for solving the problem.

Patent Document 1: JP 09-269504 A

DISCLOSURE OF THE INVENTION

Problem to be Solved by the Invention

The present invention has been made in view of solving the above problem, and an object of the present invention is therefore to provide a liquid crystal panel and a liquid crystal display apparatus in which light leakage occurring from a peripheral portion of a screen is small, and which has excellent display uniformity.

Means for Solving the Problem

Based on consideration that the light leakage in a high humidity environment of a liquid crystal display apparatus using a conventional liquid crystal panel is caused by the warpage of the liquid crystal cell, the inventors of the present invention placed polarizing plates having a dimensional change ratio suppressing the warpage of a liquid crystal cell on both sides of the liquid crystal cell, and have found that a liquid crystal panel and a liquid crystal display apparatus having much excellent display uniformity can be provided.

A liquid crystal panel according to an embodiment of the present invention includes: a liquid crystal cell; a first polarizing plate placed on a viewer side of the liquid crystal cell; and a second polarizing plate placed on an opposite side of the viewer side of the liquid crystal cell. A dimensional change ratio ($C_1$) of the first polarizing plate is larger than a dimensional change ratio ($C_2$) of the second polarizing plate.

In one embodiment of the invention, a difference ($\Delta C = C_1 - C_2$) between the dimensional change ratio ($C_1$) of the first polarizing plate and the dimensional change ratio ($C_2$) of the second polarizing plate is 0.02% or more.

In another embodiment of the invention, the liquid crystal cell includes a liquid crystal layer, a first substrate placed on one side of the liquid crystal layer, and a second substrate placed on the other side of the liquid crystal layer. A pixel electrode and a common electrode are formed on the first substrate or the second substrate.

In still another embodiment of the invention, the dimensional change ratio ($C_1$) of the first polarizing plate is 0.03% to 0.20%.

In still another embodiment of the invention, the dimensional change ratio ($C_2$) of the second polarizing plate is 0.01% to 0.18%.

In still another embodiment of the invention, a difference ($\Delta W = W_2 - W_1$) between a moisture content ($W_2$) of the second polarizing plate and a moisture content ($W_1$) of the first polarizing plate is 0.1% to 0.5%.

In still another embodiment of the invention, the first polarizing plate includes a first polarizer, a first protective layer placed on the liquid crystal cell side of the first polarizer, and a second protective layer placed on an opposite side of the liquid crystal cell side of the first polarizer. The first protective layer exhibits substantially optical isotropy.

In still another embodiment of the invention, the liquid crystal panel further includes a surface treatment layer on a side opposite to the first polarizer side of the second protective layer.

In still another embodiment of the invention, the second polarizing plate includes a second polarizer, a third protective layer placed on the liquid crystal cell side of the second polarizer, and a fourth protective layer placed on a side opposite to the liquid crystal cell side of the second polarizer. The third protective layer exhibits substantially optical isotropy.

In still another embodiment of the invention, the liquid crystal panel further includes a first pressure-sensitive adhesive layer between the liquid crystal cell and the first polarizing plate.

In still another embodiment of the invention, the liquid crystal panel further includes a second pressure-sensitive adhesive layer between the liquid crystal cell and the second polarizing plate.

In still another embodiment of the invention, the first pressure-sensitive adhesive layer and/or the second pressure-sensitive adhesive layer is formed by cross-linking a pressure-sensitive composition containing a (meth) acrylic polymer (A) and a peroxide (B).

According to another aspect of the present invention, a liquid crystal display apparatus is provided. The liquid crystal display apparatus includes the liquid crystal panel as described above.

Effects of the Invention

The liquid crystal panel according to the present invention can decrease light leakage occurring in a peripheral portion of a screen in a high humidity environment.

DESCRIPTION OF REFERENCE NUMERALS

10 Liquid crystal cell
21 First polarizing plate
22 Second polarizing plate
100 Liquid crystal panel
200 Liquid crystal display apparatus

BEST MODE FOR CARRYING OUT THE INVENTION

Hereinafter, preferred embodiments of the present invention will be described, however, the present invention is not limited to such embodiments.

DEFINITION OF TERMS AND SYMBOLS

The terms and symbols as used in the present specification are as follows.

(1) Dimensional Change Ratio

A dimensional change ratio (C) refers to a change ratio of the length of a side obtained when a 10 cm×10 cm test chip cut out from a polarizing plate is stored in a thermo-hygrostat at 40° C. and an RH of 70% for 20 hours, and is allowed stand for one hour at 23° C. Specifically, the dimensional change ratio is obtained by an expression: C={(Length of the side after the test−Length of the side before the test)/Length of the side before the test}×100.

(2) Refractive Index (nx, ny, nz)

"nx" represents a refractive index in a direction in which an in-plane refractive index becomes maximum (i.e., in a slow axis direction), "ny" represents a refractive index in a direction perpendicular to the slow axis in the same plane, and "nz" represents a refractive index in a thickness direction.

(3) In-Plane Retardation Value

An in-plane retardation value (Re[λ]) refers to a retardation value of a film in a plane of the film at a wavelength λ (nm) at 23° C. Re[λ] is obtained by Re[λ]=(nx−ny)×d where the thickness of the film is d (nm).

(4) Thickness Direction Retardation Value

A thickness direction retardation value (Rth[λ]) refers to a retardation value in a film thickness direction at a wavelength λ (nm) at 23° C. Rth[λ] is obtained by Rth[λ]=(nx−nz)×d where the thickness of the film is d (nm).

A. Overview of a Liquid Crystal Panel

Figure 1:
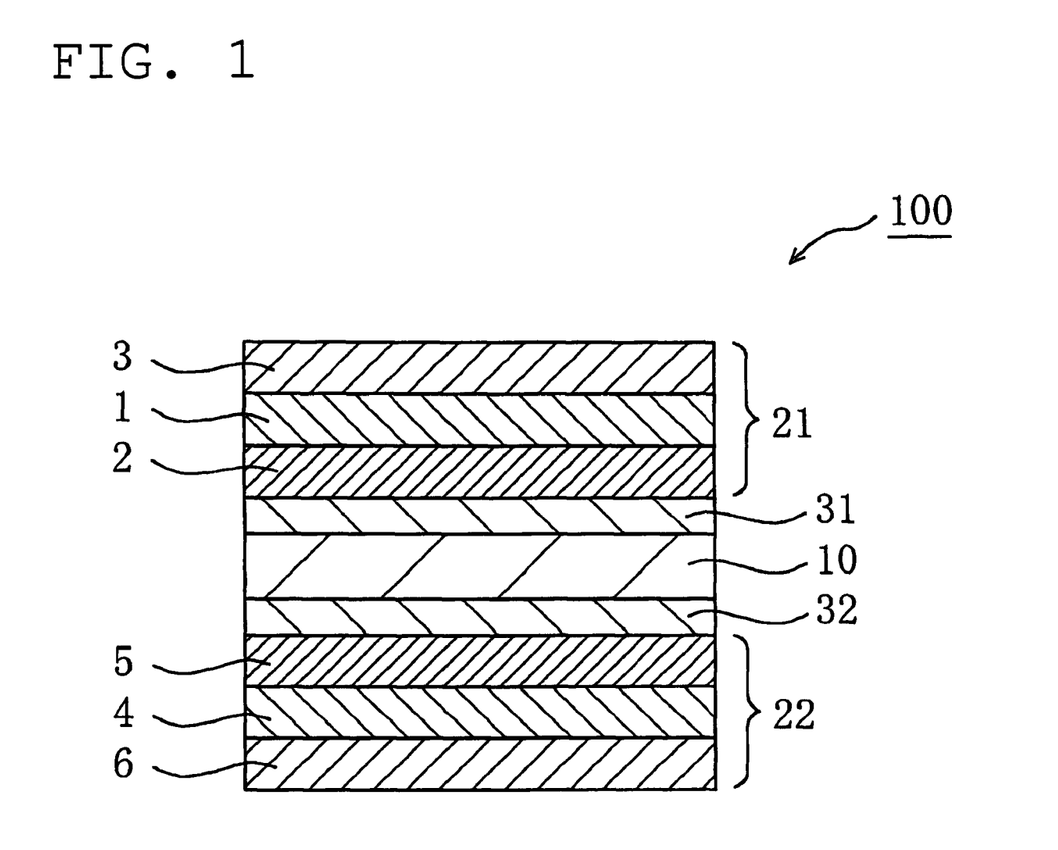
FIG. 1 Schematic cross-sectional view of a liquid crystal panel according to a preferred embodiment of the present invention.

FIG. 1 is a schematic cross-sectional view of a liquid crystal panel according to one embodiment of the present invention. A liquid crystal panel 100 includes a liquid crystal cell 10, a first polarizing plate 21 placed on a viewer side of the liquid crystal cell 10, and a second polarizing plate 22 placed on the opposite side of the viewer side of the liquid crystal cell 10. A dimensional change ratio ($C_1$) of the first polarizing plate is larger than a dimensional change ratio ($C_2$) of the second polarizing plate. With such a liquid crystal panel, when a liquid crystal cell is curved in a concave shape on a viewer side in a high humidity environment, the warpage of the liquid crystal cell can be suppressed efficiently. As a result, a liquid crystal display apparatus, in which light leakage occurring in a peripheral portion of a screen is small and which has excellent display uniformity, can be obtained.

A difference ($\Delta C = C_1 - C_2$) between the above dimensional change ratio ($C_1$) of the first polarizing plate and the above dimensional change ratio ($C_2$) of the second polarizing plate is preferably 0.02% or more, more preferably 0.02% to 0.09%, particularly preferably 0.03% to 0.07%, and most preferably 0.03% to 0.05%. By using two polarizing plates having a dimensional change ratio difference in the above range, a liquid crystal display apparatus which has much more excellent display uniformity can be obtained.

Preferably, the first polarizing plate 21 includes a first polarizer 1, a first protective layer 2 placed on the liquid crystal cell 10 side of the first polarizer 1, and a second protective layer 3 placed on a side opposite to the liquid crystal cell 10 side of the first polarizer 1. Preferably, the second polarizer 22 includes a second polarizer 4, a third protective layer 5 placed on the liquid crystal cell 10 side of the second polarizer 4, and a fourth protective layer 6 placed on a side opposite to the liquid crystal cell 10 side of the second polarizer 4. Preferably, the liquid crystal panel 100 includes a first pressure-sensitive adhesive layer 31 between the liquid crystal cell 10 and the first polarizing plate 21, and includes a second pressure-sensitive adhesive layer 32 between the liquid crystal cell 10 and the second polarizing plate 22.

Preferably, an absorption axis of the first polarizer 1 and an absorption axis of the second polarizer 4 are substantially perpendicular to each other. Herein, the phrase "substantially perpendicular" includes the case where the angle formed by the absorption axis of the first polarizer 1 and the absorption axis of the second polarizer 4 is in the range of 90°±2.0°, and preferably 90°±1.0°.

B. Liquid Crystal Cell

As the liquid crystal cell used in the present invention, any appropriate one can be adopted. Examples of the above liquid crystal cell include an active matrix type using a thin film transistor and a simple matrix type such as a super twisted nematic liquid crystal display apparatus.

Preferably, the liquid crystal cell includes a liquid crystal layer, a first substrate placed on one side of the liquid crystal layer, and a second substrate placed on the other side of the liquid crystal layer, and pixel electrodes and counter electrodes for applying a voltage to the liquid crystal layer are formed between the first substrate and the second substrate. More specifically, the above liquid crystal cell has a configuration in which liquid crystal is sealed between a substrate with electrodes formed thereon and a substrate without electrodes. The inventors of the present invention found that such a liquid crystal cell strongly tends to be curved in a concave shape toward a viewer side in a high humidity environment. Then, by placing a polarizing plate with a relatively large dimensional change ratio on a viewer side of a liquid crystal panel, a liquid crystal display apparatus in which light leakage occurring in a peripheral portion of a screen is small and which has excellent display uniformity can be obtained.

Representative examples of a liquid crystal cell having the above configuration include an in-plane switching (IPS) mode and a fringe field switching (FFS) mode, according to the classification based on a driving mode. The IPS mode and the FFS mode may adopt a V-shaped electrode, a zigzag electrode, or the like, respectively. Examples of a commercially available liquid crystal display apparatus employing a liquid crystal cell of the above-mentioned structure include: 20V-type wide liquid crystal television "Wooo" (trade name, manufactured by Hitachi, Ltd.); 19-inch liquid crystal display "ProLite E481S-1" (trade name, manufactured by Iiyama Corporation); and 17-inch TFT liquid crystal display "FlexScan L565" (trade name, manufactured by Eizo Nanao Corporation).

C. Polarizing Plate

As the polarizing plates (the first polarizing plate and the second polarizing plate) used in the present invention, any appropriate one can be adopted, as long as the dimensional change ratio thereof satisfies the above relationship. As used herein, a "polarizing plate" refers to the one which converts natural light or polarized light into linearly polarized light, elliptically polarized light, or circularly polarized light.

The thickness of the above polarizing plate is not particularly limited, and includes the general concept of a thin film, a film, and a sheet. The thickness of the above polarizing plate is preferably 1 μm to 250 μm, and more preferably 20 μm to 250 μm. By setting the thickness of the polarizing plate in the above range, the polarizing plate having excellent mechanical strength can be obtained.

The above polarizing plate may be composed of a single layer (which is also referred to as polarizer) having a polarization function, or may be composed of a laminate having a plurality of layers. In the case where the above polarizing plate is a laminate, representative examples of the layered configuration include (a) a configuration (e.g., a configuration of FIG. 1) including a polarizer and a protective layer; (b) a configuration (a configuration described in an example described later) including a polarizer, a protective layer, and a surface treatment layer; (c) a configuration (a so-called polarizing plate with a retardation layer) including a polarizer, a protective layer, and a retardation layer; and (d) a configuration including two or more polarizers. The above polarizing plate may include both a retardation layer and a surface treatment layer, or may have two or more retardation layers and/or surface treatment layers. Alternatively, in the above polarizing plate, the retardation layer may also function as a protective layer.

The dimensional change ratio ($C_1$) of the above first polarizing plate is preferably 0.03% to 0.20%, more preferably 0.06% to 0.18%, particularly preferably 0.09% to 0.16%, and most preferably 0.11% to 0.14%. By setting $C_1$ in such a range, a liquid crystal display apparatus having much more excellent display uniformity can be obtained.

The dimensional change ratio ($C_2$) of the above second polarizing plate is preferably 0.01% to 0.18%, more preferably 0.01% to 0.15%, particularly preferably 0.01% to 0.12%, and most preferably 0.01% to 0.09%. By setting $C_2$ in such a range, a liquid crystal display apparatus having much more excellent display uniformity can be obtained.

As polarizing plates used in the liquid crystal panel of the present invention, for example, those which have different dimensional change ratios can be selected from commercially available polarizing plates and appropriately combined. Alternatively, polarizing plates used in the liquid crystal panel of the present invention can also be obtained by subjecting commercially available polarizing plates to any appropriate treatment increasing or decreasing a dimensional change ratio, so as to adjust the dimensional change ratio.

In one embodiment, the liquid crystal panel of the present invention can be obtained by preparing two commercially available polarizing plates with the same dimensional change ratio, using one of the commercially available polarizing plates, which is subjected to the treatment of increasing a dimensional change ratio on a viewer side of a liquid crystal cell, and using the other commercially available polarizing plate as it is on an opposite side of the viewer side of the liquid crystal cell. In another embodiment, the liquid crystal panel of the present invention can be obtained by preparing two commercially available polarizing plates with the same dimensional change ratio, using one of the commercially available polarizing plates as it is on a viewer side of a liquid crystal cell, and using the other commercially available polarizing plate subjected to the treatment of decreasing a dimensional change ratio on an opposite side of the viewer side of the liquid crystal cell. Alternatively, the liquid crystal panel of the present invention can also be obtained by preparing two commercially available polarizing plates with different dimensional change ratios, and subjecting them to any appropriate treatment of increasing or decreasing a dimensional change ratio.

An example of the treatment of increasing or decreasing a dimensional change ratio of the above polarizing plate includes (1) a method of heat-treating a commercially available polarizing plate so as to adjust the moisture content of the polarizing plate. Specifically, when the moisture content of the polarizing plate is increased, the dimensional change ratio can be decreased, and when the moisture content of the polarizing plate is decreased, the dimensional change ratio can be increased. Alternatively, (2) there includes a method of changing the tension applied to a polarizing plate in the course of production of the polarizing plate. Specifically, in the course of production of a polarizing plate, when the tension applied to the polarizing plate is increased, the dimensional change ratio can be decreased, and when the tension applied to the polarizing plate is decreased, the dimensional change ratio can be increased. Those treatments may be performed with respect to a roll-shaped polarizing plate or a single-sheet type polarizing plate. Those treatments may be performed in combination.

In the above treatment (1), the temperature for a heat treatment is preferably 60° C. to 90° C., and more preferably 70° C. to 90° C. The heating time is 5 to 600 seconds, and more preferably 30 to 300 seconds. By performing such a heat treatment, the moisture content of the polarizing plate can be decreased by 0.1 to 0.5%, and consequently, the dimensional change ratio of the polarizing plate can be increased in a range of +0.03% to +0.09%, compared with that before the treatment.

In the above treatment (2), in order to increase the dimensional change ratio, the tension applied to the polarizing plate is preferably 300 to 700 N, and more preferably 400 to 600 N. In order to decrease the dimensional change ratio, the tension applied to the polarizing plate is preferably 50 to 150 N, and more preferably 70 to 120 N. The detailed mechanism is not known, but such a treatment enables the dimensional change ratio of the polarizing plate to be adjusted in a range of −0.08% to +0.05%, compared with that before the treatment.

Preferably, the relationship between a moisture content ($W_1$) of the above first polarizing plate and a moisture content ($W_2$) of the above second polarizing plate is $W_1 < W_2$. A difference ($\Delta W = W_2 - W_1$) between the moisture content ($W_2$) of the above second polarizing plate and the moisture content ($W_1$) of the above first polarizing plate is preferably 0.1 to 0.5%, and more preferably 0.2 to 0.4%. By setting the difference in a moisture content of the polarizing plate in the above range, a first polarizing plate and a second polarizing plate having a predetermined dimensional change ratio can be obtained.

The moisture content ($W_2$) of the above second polarizing plate is preferably 2.5 to 3.5%, and more preferably 2.7 to 3.3%. By setting the moisture content of the second polarizing plate in the above range, a polarizing plate having excellent optical properties and durability can be obtained.

The moisture content ($W_1$) of the above first polarizing plate is preferably 2.3 to 3.2%, and more preferably 2.5 to 3.1%. By setting the moisture content of the first polarizing plate in the above range, a polarizing plate having excellent optical properties and durability can be obtained.

C-1. Optical Properties of Polarizing Plate

The light transmittance (also referred to as a single axis transmittance) of the first polarizing plate, which is measured using light having wavelength of 550 nm at 23° C., is preferably 40% or more, and more preferably 42% or more. The theoretical upper limit of the single axis transmittance is 50% and the practical upper limit thereof is 46%.

A degree of polarization of the polarizing plate is preferably 99.8% or more, and more preferably 99.9% or more. The theoretical upper limit of the degree of polarization is 100%. By setting the single axis transmittance and the degree of polarization in the above range, a liquid crystal display apparatus having a small light leakage (as a result, a higher contrast ratio) in a front direction can be obtained.

The hue under the National Bureau of Standards (NBS) of the polarizing plate; a-value (simplex a-value) is preferably −2.0 or more, and more preferably −1.8 or more. The ideal a-value is 0. The hue under the National Bureau of Standards (NBS) of the polarizing plate; b-value (simplex b-value) is preferably 4.2 or less, and more preferably 4.0 or less. The ideal b-value is 0. By setting the a-value and the b-value of the polarizing plate close to 0, a liquid crystal display apparatus providing a display image with vivid color can be obtained.

The single axis transmittance, the degree of polarization and the hue can be measured by using a spectrophotometer "DOT-3" (trade name) manufactured by Murakami Color Research Laboratory. Specifically, the degree of polarization can be determined by: measuring a parallel light transmittance ($H_0$) and a perpendicular light transmittance ($H_{90}$) of the polarizing plate; and using the following equation: degree of polarization (%)=$\{(H_0-H_{90})/(H_0+H_{90})\}^{1/2} \times 100$. The parallel light transmittance ($H_0$) refers to a value of light transmittance of a parallel laminate polarizing plate manufactured by piling two identical polarizing plates such that their absorption axes are parallel to each other. The perpendicular light transmittance ($H_{90}$) refers to a value of light transmittance of a perpendicular laminate polarizing plate manufactured by piling two identical polarizers such that their absorption axes are perpendicular to each other. These light transmittances refer to a Y value obtained through visibility correction by a two-degree field of view (C light source) in accordance with JIS Z 8701-1982.

C-2. Polarizer

The polarizer used in the present invention is preferably formed of a stretched polymer film containing as a main component a polyvinyl alcohol-based resin, which contains iodine or a dichromatic dye. In the specification of the present invention, the term "stretched film" refers to a polymer film having enhanced orientation of molecules in a specific direction obtained by applying tension to an unstretched film at an appropriate temperature.

The polarizer may have any appropriate thickness in accordance with the purpose. The polarizer has a thickness of preferably 5 μm to 50 μm, and more preferably 10 μm to 30 μm.

The polyvinyl alcohol-based resin may be prepared by saponifying vinyl ester-based polymer obtained by polymerizing a vinyl ester-based monomer. A degree of saponification of the polyvinyl alcohol-based resin is preferably 95.0 mol % to 99.9 mol %. The degree of saponification of the polyvinyl alcohol-based resin may be determined in accordance with JIS K6726-1994. Use of the polyvinyl alcohol-based resin, the degree of saponification of which falls within the above ranges, can provide a polarizer having excellent durability.

The polyvinyl alcohol-based resin may have any suitable average degree of polymerization in accordance with the purpose. The average degree of polymerization is preferably 1,200 to 3,600. The average degree of polymerization of the polyvinyl alcohol-based resin can be measured through a method in accordance with JIS K6726-1994.

As a method of obtaining a polymer film containing the polyvinyl alcohol-based resin as a main component, any suitable forming method can be adopted. As a specific example of the forming method, there is a method described in JP 2000-315144 A [Example 1].

A polymer film containing the polyvinyl alcohol-based resin as a main component preferably contains a plasticizer and/or a surfactant. Examples of the plasticizer include polyhydric alcohols such as ethylene glycol and glycerin. The polyhydric alcohols are used for the purpose of further enhancing the dyeability and stretchability of a polarizer. An example of the surfactant includes a non-ionic surfactant. The surfactant is also used for the purpose of further enhancing the dyeability and stretchability of a polarizer.

As the polymer film containing the polyvinyl alcohol-based resin as a main component, a commercially available product can be used as it is. Specific examples of the commercially available polymer film include "Kuraray Vinylone Film" (trade name) manufactured by Kuraray Co., Ltd., "Tohcello Vinylone Film" (trade name) manufactured by Tohcello Co., Ltd., and "Nichigo Vinylone Film" (trade name) manufactured by The Nippon Synthetic Chemical Industry, Co., Ltd.

Figure 2:
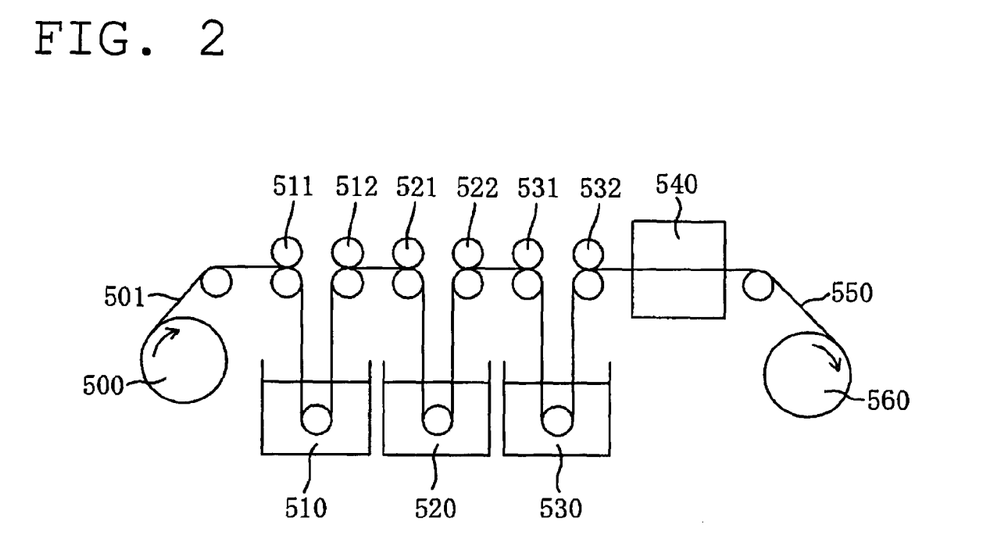
FIG. 2 Schematic diagram illustrating a concept of a typical production process of a polarizer used in the present invention.

An example of the method of producing a polarizer will be described referring to FIG. 2. FIG. 2 is a schematic view showing a concept of a typical method of producing a polarizer used in the present invention. For example, a polymer film 501 containing a polyvinyl alcohol-based resin as a main component is fed from a feed part 500, immersed in a bath 510 containing an aqueous iodine solution, so as to be subjected to swelling treatment and coloring treatment under tension in a longitudinal direction of the film by rollers 511 and 512 at different speed ratios. Next, the film is immersed in a bath 520 containing an aqueous boric acid/potassium iodide solution, so as to be subjected to crosslinking treatment under tension in a longitudinal direction of the film by rollers 521 and 522 at different speed ratios. The film subjected to crosslinking treatment is immersed in a bath 530 containing an aqueous potassium iodide solution by rollers 531 and 532, so as to be subjected to water washing treatment. The film subjected to water washing treatment is dried by drying means 540 to adjust its moisture content, and taken up in a take-up part 560. The polymer film containing a polyvinyl alcohol-based resin as a main component may be stretched to a 5 times to 7 times length of the original length through the above-mentioned processes, to thereby obtain a polarizer 550.

C-3. First Protective Layer

Referring to FIG. 1, the first protective layer 2 is placed on the liquid crystal cell 10 side of the first polarizer 1. The above first protective layer is used for the purpose of preventing a polarizer from being shrunk or expanding, and being degraded due to UV-rays.

The thickness of the above first protective layer can be selected appropriately depending upon the purpose. The thickness of the above protective layer is preferably 20 μm to 100 μm. By setting the thickness of the first protective layer in the above range, a polarizing plate having excellent mechanical strength and durability can be obtained.

The transmittance of the above first protective layer, measured with light having a wavelength of 590 nm at 23° C., is preferably 90% or more, and the practical upper limit of the above transmittance is 96%.

The absolute value of a photoelastic coefficient (C[590] ($m^2$/N)) of the above first protective layer is preferably $1\times10^{-12}$ to $100\times10^{-12}$, and more preferably $1\times10^{-12}$ to $60\times10^{-12}$. By using a first protective layer having the absolute value of the photoelastic coefficient in the above range, a polarizing plate in which optical unevenness due to distortion is unlikely to occur can be obtained.

The first protective layer used in the liquid crystal panel of the present invention is placed between the polarizer and the liquid crystal cell, so the optical properties thereof may influence the display characteristics of the liquid crystal display apparatus. Thus, it is preferred that the above first protective layer have an appropriate retardation value.

Preferably, the above first protective layer exhibits substantially optical isotropy. Herein, the phrase "exhibiting substantially optical isotropy" includes the case where Re[590] is less than 10 nm, and an absolute value of a thickness direction retardation value (|Rth[590]|) is less than 10 nm.

The Re[590] of the first protective layer is preferably less than 10 nm, more preferably 8 nm or less, and particularly preferably 5 nm or less. By setting the Re[590] in the above range, a liquid crystal display apparatus having an extremely small color shift in an oblique direction can be obtained.

The absolute value of Rth[590] of the above first protective layer (|Rth[590]|) is preferably less than 10 nm, more preferably 8 nm or less, and particularly preferably 5 nm or less. By setting |Rth[590]| in the above range, a liquid crystal display apparatus having an extremely small color shift in an oblique direction can be obtained.

As a material for forming the first protective layer, any appropriate material can be adopted. Preferably, the first protective layer is a polymer film containing cellulose-based resin. The cellulose-based resin has excellent adhesion with the polarizer. Therefore, a polarizing plate can be obtained in which floating and peeling do not occur between the polarizer and the protective layer even in a high-temperature and high-humidity environment.

As the cellulose-based resin, any appropriate resin can be adopted. The cellulose-based resin is preferably a cellulose organic acid ester or a cellulose-mixed organic acid ester in which a part or an entirety of a hydroxyl group of cellulose is replaced by an acetyl group, a propionyl group and/or a butyloyl group. Specific examples of the cellulose organic acid ester include cellulose acetate, cellulose propionate, and cellulose butyrate. Specific examples of the cellulose-mixed organic acid ester include cellulose acetate propionate and cellulose acetate butyrate. The cellulose-based resin is produced, for example, by a method described in paragraphs [0040] and [0041] of JP 2001-188128 A.

Regarding the weight average molecular weight (Mw) of the cellulose-based resin, a value measured by a gel permeation chromatograph (GPC) method with a tetrahydrofuran solvent is preferably 20,000 to 1,000,000, and more preferably 25,000 to 800,000. The weight average molecular weight is a value measured by a method described in the Examples. If the weight average molecular weight is in the above range, the first protective layer having excellent mechanical strength, and having satisfactory solubility, formability, and operability of flow-casting can be obtained.

A glass transition temperature (Tg) of the cellulose-based resin is preferably 110 to 185° C. Tg of 110° C. or higher facilitates formation of a polymer film with favorable thermal stability, and Tg of 185° C. or lower has excellent forming processability. The glass transition temperature (Tg) can be determined by DSC method mentioned in accordance with JIS K 7121.

As a method of obtaining the polymer film containing the cellulose-based resin, any appropriate forming method can be employed. Examples of the forming method include compression molding, transfer molding, injection molding, extrusion molding, blow molding, powder molding, FRP molding, and solvent casting. Among them, solvent casting is preferred. This is because a polymer film having excellent smoothness and optical uniformity can be obtained.

The above solvent casting method is specifically a method of defoaming a concentrated solution (dope) in which a resin composition containing a resin as a main component, an additive, and the like are dissolved, flow-casting the resultant solution uniformly in a sheet shape on the surface of an endless stainless belt or a rotation drum, and evaporating the solvent to form a film. As the condition adopted during film formation, any appropriate condition can be selected depending upon the purpose.

The polymer film containing the cellulose-based resin can further contain any appropriate additive. Specific examples of the additive include a plasticizer, a thermal stabilizer, a light stabilizer, a lubricant, an antioxidant, a UV absorber, a flame retardant, a colorant, an antistatic agent, a compatibilizing agent, a cross-linking agent, and a thickener. The content of the additive may be appropriately set in accordance with the purpose. The content of the additive is preferably more than 0 and 20 parts by weight or less with respect to 100 parts by weight of the cellulose-based resin.

As the first protective layer, a commercially available film can be used as it is. Alternatively, a commercially available film subjected to secondary treatment such as stretching treatment and/or shrinking treatment can be used. Examples of the commercially available polymer film containing a cellulose-based resin include FUJITAC series (ZRF80S, TD80UF, TDY-80UL (trade name)) manufactured by Fuji Photo Film Co., Ltd. and "KC8UX2M" (trade name) manufactured by Konica Minolta Opto, Inc.

C-4. Second Protective Layer

Referring to FIG. 1, the second protective layer 3 is placed on the side opposite to the liquid crystal cell 10 side of the first polarizer 1. The above second protective layer 3 is used for the purpose of preventing a polarizer from being shrunk or expanding, and being degraded due to UV-rays.

As the second protective layer, any appropriate layer, can be used. Preferably, a layer having a thickness, a light transmittance, and absolute values of a photoelastic coefficient in the ranges described in the above section C-3 can be used. It should be noted that: since the second protective layer is placed outside of the polarizer, it is not necessary to precisely adjust retardation values.

As a material for forming the second protective layer, any appropriate material can be adopted. Preferably, the second protective layer is a polymer film containing a cellulose-based resin. As the polymer film containing a cellulose-based resin, preferably films similar to those described in the above section C-3 can be used.

Preferably, a surface treatment layer may be provided on an opposite side with respect to the first polarizer side (i.e., the outermost side) of the second protective layer. As the surface treatment layer, any suitable one can be adopted in accordance with the purpose. Examples of the surface treatment layer include a hard coat treatment layer, an antistatic treatment layer, a reflection preventive treatment (anti-reflection treatment) layer, and a diffusion treatment (anti-glare treatment) layer. These surface treatment layers are used for the purpose of preventing a screen from being contaminated or damaged, and preventing a display image from becoming difficult to see due to the incidence of light of a fluorescent lamp in a room or sunlight. As the surface treatment layer, a base film with a treatment agent for forming the treatment layer bonded to the surface thereof is generally used. The base film may also function as the second protective layer. Further, the surface treatment layer may have, for example, a multi-layered structure in which a hard coat treatment layer is laminated on an antistatic treatment layer.

For example, as the second protective layer, a commercially available polymer film subjected to surface treatment can be used as it is. Alternatively, a commercially available polymer film may be subjected to any surface treatment. Examples of the commercially available diffusion treatment (anti-glare treatment) product include AG150, AGS1, AGS2, and AGT1 manufactured by Nitto Denko Corporation. Examples of the commercially available reflection preventing treatment (anti-reflection treatment) product include ARS and ARC manufactured by Nitto Denko Corporation. Examples of the commercially available film subjected to hard coat treatment and antistatic treatment include "KC8UX-HA" (trade name) manufactured by Konica Minolta Opto, Inc. An example of the commercially available film subjected to a reflection preventing treatment includes ReaLook series manufactured by Nippon Oil and Fats Co., Ltd.

C-5. Third Protective Layer

Referring to FIG. 1, the third protective layer 5 is placed on a liquid crystal cell 10 side of the second polarizer 4. For the third protective layer used in the present invention, any appropriate conditions, materials, and the like described with respect to the first protective layer can be adopted. The first protective layer and the third protective layer may be identical to or different from each other. Preferably, the third protective layer exhibits substantially optical isotropy.

C-6. Fourth Protective Layer

Referring to FIG. 1, the fourth protective layer 6 is placed on an opposite side of the second polarizer 4 with respect to the liquid crystal cell 10 side. For the fourth protective layer used in the present invention, any appropriate conditions, materials, and the like described with respect to the second protective layer can be adopted. The second protective layer and the fourth protective layer may be identical to or different from each other.

D. Pressure-Sensitive Adhesive Layer

Referring to FIG. 1, the first pressure-sensitive adhesive layer 31 is provided between the liquid crystal cell 10 and the first polarizing plate 21. The second pressure-sensitive adhesive layer 32 is provided between the liquid crystal cell 10 and the second polarizing plate 22. The pressure-sensitive adhesive layers (the first and second pressure-sensitive adhesive layers) used in the present invention can be formed of any appropriate material. As a specific example, a pressure-sensitive adhesive layer formed by cross-linking a pressure-sensitive adhesive composition will be described. The pressure-sensitive adhesive composition will be described later. In the present specification, the term "cross-link" refers to a case where a polymer is chemically cross-linked to form a three-dimensional network structure.

The above-mentioned pressure-sensitive adhesive layer may further contain appropriate optional components. Examples of the optional components include metal powder, glass fibers, glass beads, silica, and a filler. The content of the optional component is preferably more than 0 to 10 parts by weight, more preferably more than 0 to 5 parts by weight with respect to 100 parts by weight of a total solid forming the above-mentioned pressure-sensitive adhesive layer. Further, the above-mentioned pressure-sensitive adhesive layer may contain materials (e.g., a remaining solvent, an additive, an oligomer, etc.) migrated from an adjacent layer.

D-1. Pressure-Sensitive Adhesive Composition

The pressure-sensitive adhesive composition at least contains a (meth) acrylic polymer (A). The (meth) acrylic polymer (A) refers to a polymer or a copolymer synthesized from an acrylic monomer and/or a methacrylic monomer (referred to as (meth)acrylate in this specification). In the case where the (meth)acrylic polymer (A) is a copolymer, an arrangement state of copolymer molecules is not particularly limited. The copolymer may be a random copolymer, a block copolymer, or a graft copolymer. A preferred molecular arrangement state of the (meth)acrylic polymer (A) is a random copolymer.

The (meth)acrylic polymer (A) is obtained through homopolymerization or copolymerization of alkyl(meth) acrylate (a1).

An alkyl group of alkyl(meth)acrylate (a1)) may be linear, branched, or cyclic. The number of carbon atoms in the alkyl group of alkyl(meth)acrylate (a1) is preferably approximately 1 to 18, and more preferably 1 to 10.

Examples of the above-mentioned alkyl(meth)acrylate (a1) include methyl(meth)acrylate, ethyl(meth)acrylate, propyl (meth)acrylate, n-butyl(meth)acrylate, iso-butyl(meth) acrylate, t-butyl(meth)acrylate, n-pentyl(meth)acrylate, iso-pentyl (meth)acrylate, n-hexyl(meth)acrylate, iso-hexyl (meth)acrylate, n-heptyl(meth)acrylate, iso-heptyl(meth) acrylate, 2-ethylhexyl (meth)acrylate, n-octyl(meth)acrylate, iso-octyl(meth)acrylate, n-nonyl(meth)acrylate, iso-nonyl (meth)acrylate, lauryl (meth)acrylate, stearyl(meth)acrylate, and cyclohexyl (meth)acrylate. One of them may be used alone, or two or more thereof may be used in combination. When using two or more thereof in combination, alkyl group having average of 3 to 9 carbon atoms is preferable for the alkyl(meth)acrylate (a1).

The (meth) acrylic polymer (A) is preferably a copolymer of alkyl(meth)acrylate (a1) and hydroxy-containing (meth) acrylate (a2). As such copolymers have excellent reactivity with the peroxide (B) described below, a pressure-sensitive adhesive layer having excellent tackiness may be obtained. In this case, the number of carbon atoms in the alkyl group of alkyl(meth)acrylate (a1) is preferably 1 to 8, more preferably 2 to 8, particularly preferably 2 to 6, and most preferably 4 to 6. The alkyl group of alkyl (meth)acrylate (a1) may be linear or branched.

Specific examples of the above-described hydroxy-containing (meth)acrylate (a2) include 2-hydroxyethyl (meth) acrylate, 3-hydroxypropyl(meth)acrylate, 2-hydroxypropyl (meth)acrylate, 4-hydroxybutyl(meth)acrylate, 3-hydroxybutyl (meth)acrylate, 2-hydroxybutyl(meth)acrylate, 5-hydroxypentyl (meth)acrylate, 3-hydroxy-3-methylbutyl (meth)acrylate, 6-hydroxyhexyl(meth)acrylate, 7-hydroxyheptyl(meth)acrylate, 8-hydroxyoctyl(meth)acrylate, 10-hydroxydecyl(meth)acrylate, 12-hydroxylauryl (meth)acrylate, and (4-hydroxymethylcyclohexyl)-methylacrylate. One of them may be used alone, or two or more thereof may be used in combination.

The number of carbon atoms in a hydroxyalkyl group of the hydroxyl-containing (meth)acrylate (a2) is preferably equal to or more than the number of carbon atoms in the alkyl group of alkyl(meth)acrylate (a1). The number of carbon atoms in the hydroxyalkyl group of the hydroxyl-containing (meth) acrylate (a2) is preferably 2 to 8, and more preferably 4 to 6. In this way, the number of carbon atoms is adjusted so that reactivity with the peroxide (B) is improved and a pressure-sensitive adhesive layer having much more excellent tackiness may be obtained. Further, reactivity with an isocyanate compound (C) described below can be excellent. In a case where 4-hydroxybutyl(meth)acrylate is used as hydroxy-containing (meth)acrylate (a2), for example, methyl (meth)acrylate, ethyl(meth)acrylate, propyl(meth)acrylate, or butyl (meth)acrylate is preferably used as alkyl(meth)acrylate (a1).

A copolymerization amount of hydroxy-containing (meth) acrylate (a2) is preferably 0.1 to 10 mol %, more preferably 0.2 to 5 mol %, and particularly preferably 0.3 to 1.1 mol %. A copolymerization amount within the above range may provide a pressure-sensitive adhesive layer having excellent adherence, durability, and stress relaxation property.

The (meth)acrylic polymer (A) may be obtained through copolimarization of additional components with the above-mentioned alkyl(meth)acrylate (a1) and hydroxy-containing (meth)acrylate (a2). The additional components are not particularly limited, but preferred examples thereof include (meth)acrylic acid, benzyl (meth)acrylate, methoxyethyl (meth)acrylate, ethoxymethyl (meth)acrylate, phenoxyethyl (meth)acrylate, (meth) acrylamide, vinyl acetate, and (meth) acrylonitrile. A copolymerization amount of the additional components is preferably 100 parts by weight or less, and more preferably 50 parts by weight or less with respect to 100 parts by weight of alkyl(meth)acrylate (a1).

A weight average molecular weight (Mw) of the (meth) acrylic polymer (A) is preferably 1,000,000 or more, more preferably 1,200,000 to 3,000,000, and particularly preferably 1,200,000 to 2,500,000. Note that, the Mw may be adjusted by appropriately selecting the solvent, the temperature, the additives described below and the like at the time of polymerization.

The (meth) acrylic polymer (A) can be produced by any appropriate method. For example, a radical polymerization method such as a bulk polymerization method, a mass polymerization method, a solution polymerization method, and a suspension polymerization method can be appropriately selected. In the radical polymerization method, any appropriate radical polymerization initiator (e.g., an azo type, a peroxide type) can be used. The reaction temperature is generally about 50° C. to 80° C., and the reaction time is generally 1 to 30 hours.

Among the above-mentioned polymerization methods, the solution polymerization method is preferable. This is because the polymerization temperature can be adjusted with high precision, and a polymer solution after polymerization is easily taken out of a reaction container. Examples of a solvent used in the solution polymerization method generally include ethyl acetate and toluene. The solution concentration is generally about 20 to 80% by weight. The solution polymerization will be described specifically. For example, a monomer is dissolved in a solvent, and a polymerization initiator such as azobisisobutyronitrile is added in an amount of 0.01 to 0.2 parts by weight with respect to 100 parts by weight of a monomer to prepare a solution. After that, in a nitrogen atmosphere, the temperature of the solution is set at 50° C. to 70° C., whereby a reaction is effected for 8 to 30 hours.

Preferably, the above-mentioned pressure-sensitive adhesive composition may contain a peroxide (B). This is because, a liquid crystal panel and a liquid crystal display apparatus both having further suppressed light leakage in a high humidity environment can be obtained. The peroxide (B) is not particularly limited as long as a radical is generated by heating to cross-link (meth)acrylic polymer (A). Examples of peroxide (B) include hydroperoxides, diarkylperoxides, peroxyesters, diacylperoxides, peroxydicarbonates, peroxyketals, and ketone peroxides. Specific examples thereof include di(2-ethylhexyl)peroxydicarbonate, di(4-t-butylcyclohexyl) peroxydicarbonate, di-sec-butylperoxydicarbonate, t-butylperoxyneodecanoate, t-hexylperoxypivalate, t-butylperoxypivalate, dilauroyl peroxide, di-n-octanoyl peroxide, 1,1,3,3-tetramethylbutylperoxy-2-ethylhexanoate, 1,1,3,3-tetramethylbutylperoxyisobutylate, di(4-methylbenzoyl) peroxide, dibenzoyl peroxide, t-butylperoxybutylate, benzoyl-m-methylbenzoyl peroxide, and m-toluoyl peroxide. Those peroxides may be used alone or in combination of two or more.

Among the above-mentioned peroxides, diacyl peroxides are preferably used, and dibenzoyl peroxide and/or benzoyl m-methylbenzoyl peroxide are used more preferably. This is because these peroxides have a one-minute half-life temperature described later of 90° C. to 140° C., and hence, is excellent in storage stability and is capable of controlling a cross-linking reaction with high precision.

As the above-mentioned peroxide (B), a commercially available product can be used as it is. Specific examples of the commercially available products include PEROYL series ("IB, 335, L, SA, IPP, NPP, TCP, etc." (product name) produced by NOF Corporation) and NYPER series ("FF, BO, NS, E, BMT-Y, BMT-K40, BMT-M, etc. (product name)) produced by NOF Corporation).

The blending amount of the above-mentioned peroxide (B) is preferably 0.01 to 1 part by weight with respect to 100 parts by weight of the (meth)acrylic polymer (A), more preferably 0.05 to 0.8 parts by weight, particularly preferably 0.1 to 0.5 parts by weight, and most preferably 0.15 to 0.45 parts by weight. By setting the blending amount of the peroxide (B) in the above-mentioned range, the pressure-sensitive adhesive layer can achieve a sufficiently satisfactory holding force, and further can exhibit appropriate stress relaxation, and excellent heat stability. Consequently, in the case where the pressure-sensitive adhesive layer is used in a liquid crystal display apparatus, the display unevenness occurring in high-temperature environment can be suppressed effectively. By allowing a peroxide to be contained, a pressure-sensitive adhesive layer with a small moisture content can be obtained. It is considered that the small moisture content of the pressure-sensitive adhesive layer also contributes to the reduction in display unevenness of the liquid crystal display apparatus.

It is preferable that the above-mentioned pressure-sensitive adhesive composition can further contain an isocyanate compound. This is because the adherence (which is also referred to as an anchor force) can be enhanced. Examples of isocyanate compounds include: isocyanate monomer such as tolylene diisocyanate, chlorophenylene diisocyanate, hexamethylene diisocyanate, tetramethylene diisocyanate, isophorone diisocyanate, xylylene diisocyanate, diphenylmethane diisocyanate, trimethylolpropanexylene diisocyanate, and hydrogenated diphenylmethane diisocyanate; adduct isocyanate compounds obtained by adding those isocyanate monomers to a polyvalent alcohol such as trimethylolpropane; isocyanurate compounds; biuret type compounds; and urethane prepolymer type isocyanate obtained by addition reaction of any appropriate polyether polyol, polyester polyol, acryl polyol, polybutadiene polyol, polyisoprene polyol, or the like. Those may be used alone or in combination of two or more. Of those, trimethylolpropanexylene diisocyanate is preferably used to improve the adherence.

The isocyanate compound may employ a commercially available product as it is. Examples of the commercially available isocyanate compound include: Takenate series ("D-110N, 500, 600, 700, etc." (product name)) produced by Mitsui Chemicals Polyurethanes, Inc.; and Coronate series ("L, MR, EH, HL, etc." (product name)) produced by Nippon Polyurethane Industry Co., Ltd.).

The blending amount of the above-mentioned isocyanate compound can be set to be an appropriate amount depending on the purpose. For example, in the case where the peroxide (B) is not used, the blending amount is preferably 0.1 to 1.5 parts by weight, more preferably 0.3 to 1.0 part by weight, and particularly preferably 0.4 to 0.8 parts by weight with respect to 100 parts by weight of the (meth)acrylic polymer (A). In the case where the peroxide (B) is used, the blending amount is preferably 0.005 to 0.5 parts by weight, more preferably 0.005 to 0.2 parts by weight, and particularly preferably 0.01 to 0.08 parts by weight with respect to 100 parts by weight of the (meth) acrylic polymer (A). By setting the blending amount of an isocyanate compound in the above-mentioned range, the pressure-sensitive adhesive layer can sufficiently achieve a satisfactory holding force, and further, can exhibit appropriate stress relaxation and excellent heat stability. Consequently, in the case where the pressure-sensitive adhesive layer is used in a liquid crystal display apparatus, a liquid crystal display apparatus in which the display unevenness occurring in high-temperature environment is small can be obtained. Further, even in severe (high temperature, high humidity) environment, the adherence can be satisfactory. It is also considered that the use of a peroxide and an isocyanate compound as a cross-linking agent contributes to the reduction in light leakage.

It is preferable that the above-mentioned pressure-sensitive adhesive composition can further contain a silane coupling agent. This is because the adherence between the pressure-sensitive adhesive layer and the liquid crystal cell substrate can be enhanced. As silane coupling agent, a substance having any appropriate functional group can be used. Examples of functional groups include a vinyl group, an epoxy group, a methacryloxy group, an amino group, a mercapto group, an acryloxy group, an acetoacetyl group, an isocyanate group, a styryl group, and a polysulfide group. Specific examples of silane-coupling agent include vinyltrimethoxy silane, γ-glycidoxypropyltrimethoxy silane, γ-glycidoxypropyltriethoxy silane, 3-glycidoxypropylmethyldimethoxy silane, 2-(3,4-epoxycyclohexyl)ethyltrimethoxy silane, p-stylyltrimethoxy silane, γ-methacryloxypropyltrimethoxy silane, γ-acryloxypropyltrimethoxy silane, 3-aminopropyltrimethoxy silane, N-β(aminoethyl)-γ-aminopropyltrimethoxy silane, N-(2-aminoethyl)$_3$-aminopropylmethyldimethoxy silane, γ-aminopropylmethoxy silane, γ-mercaptopropylmethyldimethoxy silane, bis(triethoxysilylpropyl)tetrasulfide, and γ-isocyanatepropyltrimethoxy silane. Of those, a silane coupling agent having an acetoacetyl group is preferably used to improve the adherence between the pressure-sensitive adhesive layer and the liquid crystal cell substrate.

As the above-mentioned silane coupling agent, a commercially available product can be used as it is. Examples of the commercially available products include KA series ("KA-1003, etc." (product name)) produced by Shin-Etsu Chemicals Co., Ltd., KBM series ("KBM-303, KBM-403, KBM-503, etc." (product name)) produced by Shin-Etsu Chemicals Co., Ltd., KBE series ("KBE-402, KBE-502, KBE-903, etc." (product name)) produced by Shin-Etsu Chemicals Co., Ltd., SH series ("SH6020, SH6040, SH6062, etc." (product name)) produced by Toray Industries, Inc., and SZ series ("SZ6030, SZ6032, SZ6300, etc." (product name)) produced by Toray Industries, Inc.

The blending amount of the above-mentioned silane coupling agent can be set to be an appropriate amount depending on the purpose. For example, the blending amount is preferably 0.001 to 2 parts by weight, more preferably 0.005 to 2 parts by weight, particularly preferably 0.01 to 1 parts by weight, and most preferably 0.02 to 0.5 parts by weight with respect to 100 parts by weight of the (meth)acrylic polymer (A). By setting the blending amount of the silane coupling agent in the above-mentioned range, the adherence can be excellent even in further severe (high temperature, high humidity) environment.

The pressure-sensitive adhesive composition may further contain various additives without departing from the purpose of the present invention. Examples of the additives include a plasticizer, a heat stabilizer, a photo stabilizer, a lubricant, an antioxidant, a UV absorber, a flame retardant, a colorant, an antistatic agent, a compatibilizing agent, a crosslinking agent, a thickener, and a pigment.

A mixing amount of the other additives may be set to any appropriate amount depending on the purpose. The mixing amount thereof is preferably more than 0 and 5 parts by weight or less with respect to 100 parts by weight of the (meth)acrylic polymer (A).

The above-mentioned pressure-sensitive adhesive composition may be prepared by, for example, mixing the above-described components with any appropriate solvent. The pressure-sensitive adhesive composition may be a solution or dispersion. The above-mentioned components and the solvent may be mixed at once. Alternatively, the components may be added to the solvent in the predetermined order. In one embodiment, the (meth)acrylic polymer (A) is dissolved in the solvent to prepare a solution; and then, the peroxide (B), the isocyanate compound and the silane coupling agent are added to the solution in this order. A solid content of the pressure-sensitive adhesive composition is preferably 15 to 45% by weight, and more preferably 20 to 40% by weight. The solid content in the above range may provide a pressure-sensitive adhesive composition having excellent application property to a substrate, and as a result, a pressure-sensitive adhesive layer having excellent surface evenness can be obtained.

D-2. Method of Cross-Linking Pressure-Sensitive Adhesive Composition (Method of Forming Pressure-Sensitive Adhesive Layer)

The pressure-sensitive adhesive layer is formed by: applying the above-mentioned pressure-sensitive adhesive composition onto a substrate; and cross-linking the applied layer. As a method of applying the pressure-sensitive adhesive composition on the substrate, an application method employing any appropriate coater may be used. As the substrate, any appropriate substrate may be employed. Preferably, a polymer film is used. More preferably, a polymer film (for example, PET film), in which the surface (on which the pressure-sensitive adhesive composition is applied) is subjected to peeling treatment, is used. The polymer film can be rolled to enhance productivity remarkably. Furthermore, the polymer film subjected to peeling treatment is capable of functioning also as a peeling liner. As a method of cross-linking the pressure-sensitive adhesive composition, a heating method is exemplified. The heating temperature is preferably 50° C. to 200° C., and more preferably 120° C. to 170° C. The heating time is preferably 5 seconds to 20 minutes, and more preferably 10 seconds to 5 minutes. According to the above heating condition, a pressure-sensitive adhesive layer having excellent tackiness can be obtained efficiently. Preferably, the pressure-sensitive adhesive layer thus formed may be subjected to an aging by being stored for appropriate period of time. In the present specification, the term "aging" refers to a case where diffusion or a chemical reaction of a material contained in a pressure-sensitive adhesive layer is effected to obtain preferable property and state. The aging conditions can be appropriately selected in accordance with the type, the content or the like of the respective components in the pressure-sensitive adhesive composition. For example, the aging temperature is preferably 10° C. to 80° C., and more preferably 20° C. to 70° C. Further, for example, the aging time is preferably at least 3 days, more preferably at least 5 days, and particularly preferably at least 7 days. If the aging time is too short, there is a possibility that the desired properties cannot be obtained. Even if the aging time is too long, the properties to be obtained has only small difference, and therefore there is no advantage in production efficiency in many cases.

Figure 3:
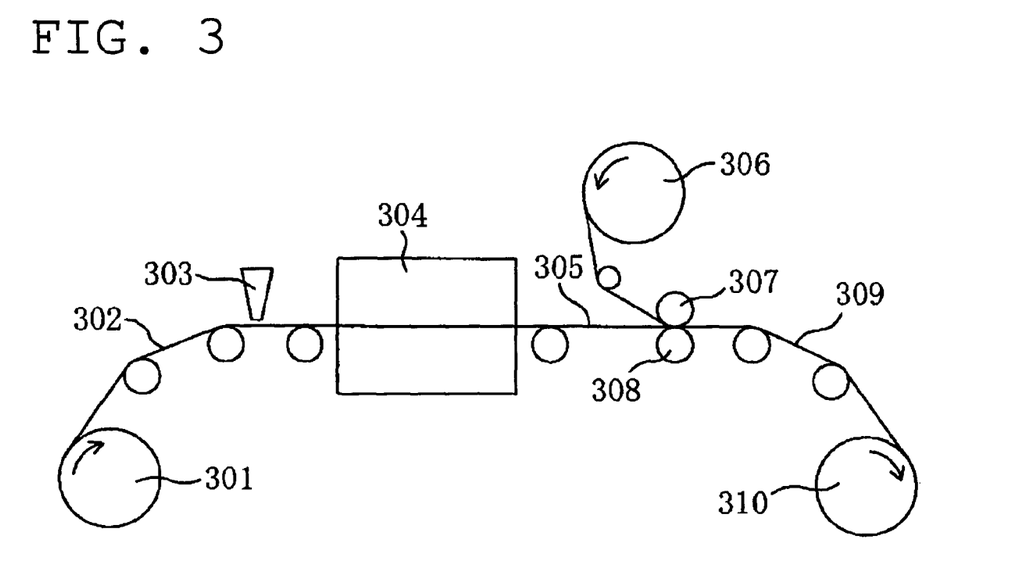
FIG. 3 Schematic diagram illustrating a concept of a typical production process of a pressure-sensitive adhesive layer used in the present invention.

An example of a method of forming the above-mentioned pressure-sensitive adhesive layer will be described with reference to FIG. 3. For example, a substrate 302 is fed from a first feed portion 301, and the above-mentioned pressure-sensitive adhesive composition is applied onto the substrate 302 in a coater portion 303. The applied substance on the surface of the substrate is sent to temperature control means (drying means) 304, and heated and dried at for example 50° C. to 200° C., whereby a pressure-sensitive adhesive layer is formed. The polarizing plate is fed from a second feed portion 306, and laminated on the pressure-sensitive adhesive layer by laminating rolls 307 and 308. A laminate 309 of the polarizing plate, the pressure-sensitive adhesive layer, and the substrate 302 thus obtained is taken up by a take-up portion 310. In the case where the substrate 302 is, for example, a Polyethyleneterephthalate film treated with a silicone peeling agent, the substrate 302 can be used as a peeling liner as it is.

E. Liquid Crystal Display Apparatus

Figure 4:
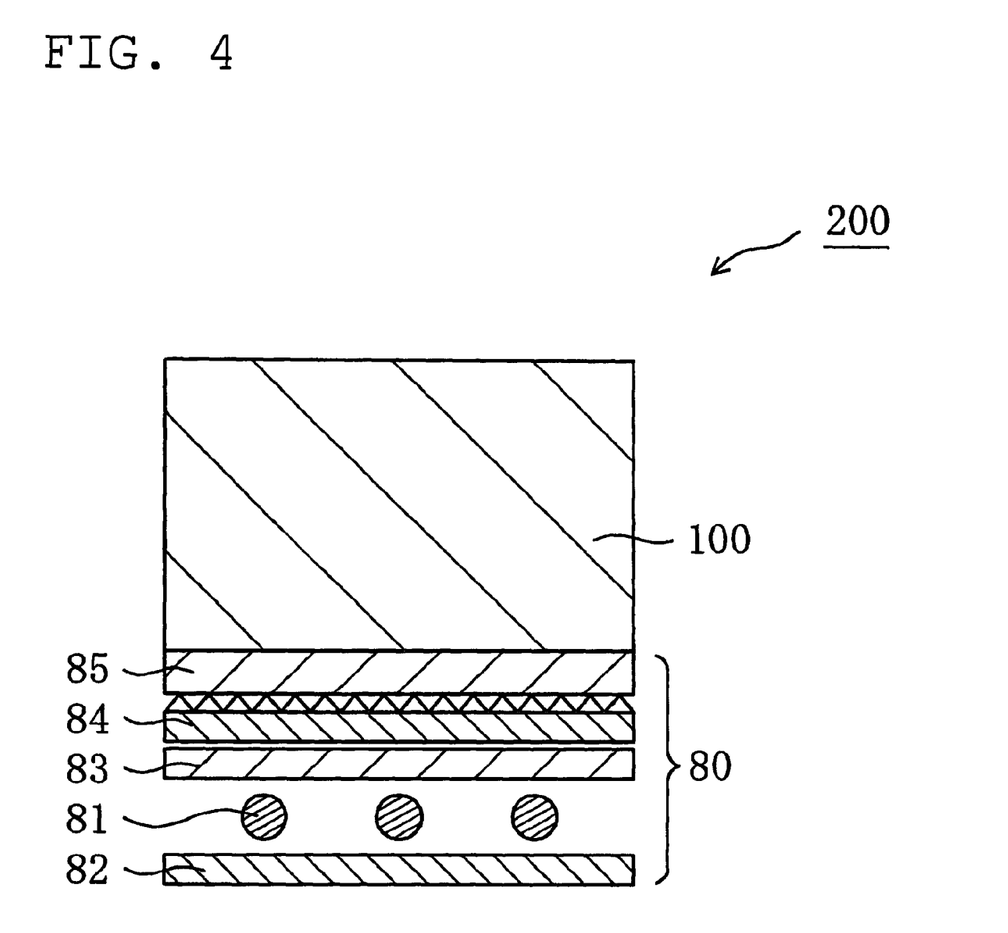
FIG. 4 Schematic cross-sectional view of a liquid crystal display apparatus according to a preferred embodiment of the present invention.

The liquid crystal display apparatus of the present invention includes the above liquid crystal panel. FIG. 4 is a schematic cross-sectional view of a liquid crystal display apparatus according to a preferred embodiment of the present invention. For ease of observation, it should be noted that the ratio of each constituent member in longitudinal, lateral, and thickness directions illustrated in FIG. 4 is different from the actual one. A liquid crystal display apparatus 200 includes a liquid crystal panel 100 and a backlight unit 80 placed on one side of the liquid crystal panel 100. In the illustrated example, the case where a backlight unit of a direct-type is adopted has been shown. However, for example, a sidelight-type may be used.

In the case where a direct-type is adopted, the backlight unit 80 preferably includes a light source 81, a reflective film 82, a diffusion plate 83, a prism sheet 84, and a brightness enhancing film 85. In the case where the sidelight-type is adopted, the backlight unit preferably further includes a light guide plate and a light reflector. As long as the effects of the present invention are obtained, a part of the optical member illustrated in FIG. 4 may be omitted or may be replaced by another optical element, depending upon the application such as an illumination system of a liquid crystal display apparatus and a driving mode of a liquid crystal cell.

The liquid crystal display apparatus may be of a transmissive type in which a screen is observed by irradiation of light from a back surface of a liquid crystal panel, or may be of a reflection type in which the screen is observed by irradiation of light from a viewer side of the liquid crystal panel. Alternatively, the liquid crystal display apparatus may be of a semi-transmissive type which has both the properties of the transmissive type and the reflection type.

F. Application of Liquid Crystal Display Apparatus

The liquid crystal display apparatus of the present invention may be used for any appropriate applications. Specific example of the application includes: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

Preferably, the liquid crystal display apparatus of the present invention is applied to a television. The screen size of the television is preferably wide 17-type (373 mm×224 mm) or more, more preferably wide 23-type (499 mm×300 mm) or more, particularly preferably wide 26-type (566 mm×339 mm) or more, and most preferably wide 32-type (687 mm×412 mm) or more.

EXAMPLES

The present invention will be described in more detail by using the following examples. However, the present invention is not limited to the examples. Analytical methods used in the examples are described below.

(1) Method of Measuring Single Axis Transmittance, Degree of Polarization, Hue a-Value and Hue b-Value of Polarizing Plate:

The single axis transmittance, the degree of polarization, the hue a-value and the hue b-value were measured by using a spectrophotometer "DOT-3" (trade name, manufactured by Murakami Color Research Laboratory) at 23° C.

(2) Method of Measuring Molecular Weight

The molecular weight was calculated using polystyrene as a standard sample by gel permeation chromatography (GPC). Specifically, the molecular weight was measured by the following apparatus and appliance under the following measurement conditions.

Measurement sample: a filtrate was used, which was obtained by dissolving the obtained sample in tetrahydrofuran to obtain a 0.1% by weight of solution, allowing the solution to stand still overnight, and filtering the solution with a membrane filter of 0.45 μm.

Analysis apparatus: "HLC-8120GPC" manufactured by Tosoh Corporation

Column: TSKgel SuperHM-H/H4000/H3000/H2000

Column size: each 6.0 mm I.D.×150 mm

Eluate: tetrahydrofuran

Flow rate: 0.6 ml/minute

Detector: RI

Column temperature: 40° C.

Injection amount: 20 μl (3) Method of Measuring Thickness

In the case where the thickness is less than 10 μm, the thickness was measured using a spectrophotometer for a thin film "Instantaneous multi-measurement system MCPD-2000" (trade name) manufactured by Otsuka Electronics Co., Ltd. In the case where the thickness is 10 μm or more, the thickness was measured using a digital micrometer "KC-351C type" manufactured by Anritsu Corporation.

(4) Method of Measuring Average Refractive Index

The average refractive index was obtained by using an Abbe refractometer "DR-M4" (trade name, manufactured by Atago Co., Ltd.) by using light with a wavelength of 589 nm at 23° C.

(5) Method of Measuring in-Plane and Thickness Direction Retardation Values (Re[$\lambda$], R40[$\lambda$], Rth[$\lambda$]):

The retardation values were measured by using an automatic birefringence analyzer "KOBRA-21ADH" (trade name) manufactured by Oji Scientific Instruments and by using light with a wavelength of $\lambda$ nm at 23° C. It should be noted that refractive indices nx, ny, and nz can be determined by: using an in-plane retardation value (Re) of respective wavelength at 23° C., a retardation value (R40) measured by inclining a slow axis by 40° as a tilt angle, a thickness (d) of the retardation layer, and an average refractive index (n0) of the retardation layer, and using computational numerical calculation. Then, Rth can be calculated from the refractive indices.

(6) Method of Measuring Transmittance:

The transmittance was measured by using a UV-vis spectrophotometer "V-560" (trade name, manufactured by JASCO Corporation) by using light of a wavelength of 590 nm at 23° C.

(7) Method of Measuring Color Shift Amount (Δxy) of Liquid Crystal Display Apparatus Color coordinates x and y were measured, which were defined by an XYZ display system at an azimuth angle of 0 to 360° and a polar angle of 0 to 80° of a screen displaying a black image in 30 minutes after a backlight is turned on in a dark room at 23° C., using "EZ Contrast 160D" (trade name) manufactured by ELDIM, Inc. A color shift amount (Δxy) in an oblique direction was calculated from an expression: $\{(x60,60-x0,0)^2+(y60,60-y0,0)^2\}^{1/2}$. Herein, x60, 60 and y60, 60 represent color coordinates x and y at an azimuth angle of 60° and a polar angle of 60°, respectively, and x0,0 and y0,0 represent color coordinates x and y at an azimuth angle of 0° and a polar angle of 0° (i.e., a front direction), respectively.

(8) Method of Evaluating in-Plane Maximum Brightness of Screen

A liquid crystal panel was stored in a thermo-hygrostat at 40° C. and an RH of 70% for 20 hours, and thereafter, taken out to a room at 23° C. The liquid crystal panel was incorporated in a liquid crystal display apparatus, and a display screen was photographed using a two-dimensional color distribution meter "CA-1500" manufactured by Konica Minolta Holdings, Inc. in a dark room at 23° C.

(9) Method of Measuring Dimensional Change Ratio (C) of Polarizing Plate

A sample cut out to 10 cm×10 cm from a polarizing plate was tested (high-humidity acceleration test) by being stored in a thermo-hygrostat at 40° C. and an RH of 70% for 20 hours, and thereafter, being allowed to stand at 23° C. for one hour. The length of one side of the polarizing plate before and after the test was measured, and a dimensional change ratio (C) was calculated from an expression:

{(Length of the side after the test−Length of the side before the test)/Length of the side before the test}×100.

(10) Method of Measuring a Moisture Content of a Polarizing Plate

A polarizing plate cut out to a size of 10 mm×30 mm was placed in a heating furnace at 150±1° C., and nitrogen gas (200 ml/min.) was allowed to bubble in a titration cell solution, whereby the moisture content of the polarizing plate was measured using Karl Fischer Titrator ["MKA-610" (trade name) manufactured by Kyoto ELECTRONICS MANUFACTURING CO., LTD].

Polarizing plates used in each example and comparative example are as follows.

(Polarizing Plate A)

A commercially available polarizing plate ["NPF TG-SIG1423DUAGS2B" (trade name) manufactured by Nitto Denko Corporation] having a configuration of a protective layer/polarizer/protective layer subjected to an antiglare treatment was used as it is as a polarizing plate A. The polarizing plate A had a dimensional change ratio of 0.066 and a moisture content of 3.0%. The optical properties of the polarizing plate A were a single axis transmittance of 42.6%, a degree of polarization of 99.99%, a hue a-value of −1.5, and a hue b-value of 3.8. The protective layer of the polarizing plate A exhibited substantially optical isotropy, and Re[590] was 0.5 nm and Rth[590] was 1.0 nm.

(Polarizing plate B)

A roll-shaped polarizing plate [roll-shaped product before punching comparable to "NPF TG-SIG1423DUAGS2B" (trade name) manufactured by Nitto Denko Corporation] was subjected to a dimensional change ratio adjustment treatment using a temperature control apparatus equipped with tension control means to obtain a polarizing plate B. In other words, a product comparable to the above polarizing plate A was subjected to a dimensional change ratio adjustment treatment to obtain a polarizing plate B. The processing conditions were: an air-circulating dry oven of 75° C., a line velocity of 10 m/min., and a line tension of 200 N. The polarizing plate B had a dimensional change ratio of 0.123 and a moisture content of 2.8%. The optical properties of the polarizing plate B were similar to those of the above polarizing plate A.

(Polarizing Plate C)

A commercially available polarizing plate ["NPF TG-SIG1423DU" (trade name) manufactured by Nitto Denko Corporation] having a configuration of a protective layer/polarizer/protective layer was used as it is as a polarizing plate C. The polarizing plate C had a dimensional change ratio of 0.083 and a moisture content of 3.0%. The optical properties of the polarizing plate C were similar to those of the above polarizing plate A.

(Polarizing plate D)

A roll-shaped polarizing plate [roll-shaped product before punching comparable to "NPF TG-SIG1423DU" (trade name) manufactured by Nitto Denko Corporation] was subjected to a dimensional change ratio adjustment treatment using a temperature control apparatus equipped with tension control means to obtain a polarizing plate D. In other words, a product comparable to the above polarizing plate C was subjected to a dimensional change ratio adjustment treatment to obtain a polarizing plate D. The processing conditions were: an air-circulating dry oven of 75° C., a line velocity of 10 m/min., and a line tension of 200 N. The polarizing plate D had a dimensional change ratio of 0.095 and a moisture content of 2.8%. The optical properties of the polarizing plate D were similar to those of the above polarizing plate A.

(Polarizing Plate E)

A roll-shaped polarizing plate [roll-shaped product before punching comparable to "NPF TG-SIG1423DU" (trade name) manufactured by Nitto Denko Corporation] was subjected to a dimensional change ratio adjustment treatment using a temperature control apparatus equipped with tension control means to obtain a polarizing plate E. In other words, a product comparable to the above polarizing plate C was subjected to a dimensional change ratio adjustment treatment to obtain a polarizing plate E. The processing conditions were: an air-circulating dry oven of 80° C., a line velocity of 10 m/min., and a line tension of 500 N. The polarizing plate E had a dimensional change ratio of 0.020. The optical properties of the polarizing plate E were similar to those of the above polarizing plate A.

(Polarizing Plate F)

A commercially available polarizing plate ["NPF SEG1423DUAGS2B" (trade name) manufactured by Nitto Denko Corporation] having a configuration of a protective layer/polarizer/protective layer subjected to an antiglare treatment was used as it is as a polarizing plate F. The optical properties of the polarizing plate F were a single axis transmittance of 44.1%, a polarization degree of 99.97%, a hue a-value of −1.5, and a hue b-value of 3.7. The protective layer of the polarizing plate F exhibited substantially optical negative uniaxiality, and Re[590] was 0.5 mm and Rth[590] was 60 nm.

(Polarizing Plate G)

A commercially available polarizing plate ["NPF SEG1423DU" (trade name) manufactured by Nitto Denko Corporation] having a configuration of a protective layer/polarizer/protective layer was used as it is as a polarizing plate G. The optical properties of the polarizing plate G were similar to those of the above polarizing plate F.

(Liquid Crystal Cell A)

A liquid crystal panel was taken out from a liquid crystal display apparatus [32V-type wide liquid crystal television "FACE (Type No.: 32LC100)" (trade name) with a screen size of 697 mm×392 mm, manufactured by Toshiba Corporation] having a liquid crystal cell of an IPS mode, and all the optical films such as polarizing plates placed on upper and lower sides of the liquid crystal cell were removed. The surfaces of both glass substrates of the obtained liquid crystal cell were washed to obtain a liquid crystal cell A.

The liquid crystal cell and the polarizing plates were laminated via the following pressure-sensitive adhesive layer.

(Pressure-Sensitive Adhesive Layer A)

To a reaction container equipped with a cooling tube, a nitrogen introduction tube, a thermometer, and a stirring apparatus, 100 parts by weight of butyl acrylate, 5 parts by weight of acrylic acid, 0.075 parts by weight of 2-hydroxyethyl acrylate, 0.3 parts by weight of 2,2-azobisisobutyronitrile, and ethyl acetate were added to prepare a solution. Next, the solution was stirred while nitrogen gas was blown thereto, and was subjected to a polymerization reaction at 60° C. for 4 hours, whereby an acrylate-based copolymer formed of butyl acrylate, acrylic acid, and 2-hydroxyethyl acrylate and having a weight-average molecular weight of 2,200,000 was obtained.

Ethyl acetate was further added to the acrylate-based copolymer obtained in the above to dilute the copolymer, whereby a polymer solution (1-A) with a total solid concentration of 30% by weight was prepared. Next, to the polymer solution (1-A), 0.6 parts by weight of isocyanate-based compound [COLONATE L (trade name) manufactured by Nippon Polyurethane Industry Co., Ltd.] and 0.075 parts by weight of a γ-glycidoxypropyltrimethoxysilane ["KBM-403" (trade name) manufactured by Shin-Etsu Chemical Co., Ltd.] with respect to 100 parts by weight of the acrylate-based copolymer were mixed in this order to prepare a polymer solution (1-B).

The polymer solution (1-B) obtained in the above was applied uniformly to a surface of a substrate (polyethylene terephthalate film treated with a silicone-based release agent) with a fountain coater. After that, the substrate with the polymer solution (1-B) was dried in an air-circulating thermostatic oven at 155° C. for 70 seconds, whereby a pressure-sensitive adhesive layer A with a thickness of 20 μm was formed on the surface of the substrate.

(Pressure-Sensitive Adhesive Layer B)

To a reaction container equipped with a cooling tube, a nitrogen introduction tube, a thermometer, and a stirring apparatus, 99 parts by weight of butyl acrylate, 1.0 parts by weight of 4-hydroxybutyl acrylate, 0.3 parts by weight of 2,2-azobisisobutylnitrile, and ethyl acetate were added to prepare a solution. Next, the solution was stirred while nitrogen gas was blown thereto, and was subjected to a polymerization reaction at 60° C. for 4 hours, whereby an acrylate-based copolymer formed of butyl acrylate and 4-hydroxybutyl acrylate and having a weight-average molecular weight of 1,650,000 was obtained.

Ethyl acetate was further added to the acrylate-based copolymer obtained in the above to dilute the copolymer, whereby a polymer solution (2-A) with a total solid content of 30% by weight was prepared. Next, to the polymer solution (2-A), 0.3 parts by weight of dibenzoyl peroxide ["Nyper BO-Y" (trade name) manufactured by NOF Corporation], 0.02 parts by weight of trimethylolpropane xylylene diisocyanate ["TAKENATE D110N" (trade name) manufactured by Mitsui Takeda Chemicals, Inc.], and 0.2 parts by weight of a silane coupling agent containing an acetoacetyl group ["A-100" (trade name) manufactured by Soken Chemical & Engineering Co., Ltd.] with respect to 100 parts by weight of the acrylate-based copolymer were compounded in this order to prepare a polymer solution (2-B).

The polymer solution (2-B) obtained in the above was applied uniformly to a surface of a substrate (polyethylene terephthalate film treated with a silicone-based release agent) with a fountain coater. After that, the substrate with the polymer solution (2-B) was dried in an air-circulating thermostatic oven at 155° C. for 70 seconds, whereby a pressure-sensitive adhesive layer B with a thickness of 20 μm was formed on the surface of the substrate.

Example 1

Production of Laminate 1

The side of the polarizing plate B which was not subjected to an antiglare treatment was subjected to a corona treatment (1.2 kW/15 m/min.). The pressure-sensitive adhesive layer A formed on the surface of the substrate was laminated on the corona treatment surface of the polarizing plate B to obtain a laminate 1. The laminate 1 was aged in an air-circulating thermostatic oven at 70° C. for 7 days.

Production of Laminate 2

The pressure-sensitive adhesive layer A formed on the surface of the substrate was laminated on the surface of the polarizing plate C which has been subjected to a corona treatment (1.2 kW/15 m/min.) to obtain a laminate 2. The laminate 2 was aged in an air-circulating thermostatic oven at 70° C. for 7 days.

(Production of Liquid Crystal Panel)

The laminate 1 with the substrate removed therefrom was attached to a viewer side of the liquid crystal cell A. More specifically, the polarizing plate B was attached to the viewer side of the liquid crystal cell A as a first polarizing plate via a pressure-sensitive adhesive layer A. At that time, the polarizing plate B was attached to the viewer side so that the longitudinal direction of the liquid crystal cell A was substantially parallel to the direction of an absorption axis of the first polarizing plate. Then, the laminate 2 with the substrate removed therefrom was attached to a backlight side of the liquid crystal cell A. More specifically, the polarizing plate C was attached to the backlight side of the liquid crystal cell A as a second polarizing plate via the pressure-sensitive adhesive layer A. At that time, the polarizing plate C was attached to the backlight side so that the longitudinal direction of the liquid crystal cell A was substantially perpendicular to the direction of an absorption axis of the second polarizing plate. Thus, a liquid crystal panel A was obtained.

(Production of Liquid Crystal Display Apparatus)

The liquid crystal panel A was connected to a backlight unit of a liquid crystal display apparatus ("32V-type TH-32LX10" manufactured by Matsushita Electric Industrial Co., Ltd.) to produce a liquid crystal display apparatus A.

Example 2

A liquid crystal display apparatus was produced by the same method as that in Example 1, except that the pressure-sensitive adhesive layer B was used in place of the pressure-sensitive adhesive layer A, as a pressure-sensitive adhesive layer for attaching the first polarizing plate and the second polarizing plate to the liquid crystal cell.

Example 3

A liquid crystal display apparatus was produced by the same method as that in Example 1, except that the polarizing plate A was used in place of the polarizing plate B as the first polarizing plate, and the polarizing plate E was used in place of the polarizing plate C as the second polarizing plate.

Comparative Example 1

A liquid crystal display apparatus was produced by the same method as that in Example 1, except that the polarizing plate A was used in place of the polarizing plate B as the first polarizing plate.

Comparative Example 2

A liquid crystal display apparatus was produced by the same method as that in Example 1, except that the polarizing plate A was used in place of the polarizing plate B as the first polarizing plate, and the polarizing plate D was used in place of the polarizing plate C as the second polarizing plate.

Reference Example 1

A liquid crystal display apparatus was produced by the same method as that in Example 1, except that the polarizing plate F was used in place of the polarizing plate A as the first polarizing plate, and the polarizing plate G was used in place of the polarizing plate C as the second polarizing plate.

Immediately after the backlight is turned on, the liquid crystal display apparatus in each example and each comparative example had satisfactory display uniformity over an entire surface.

Figure 5A:
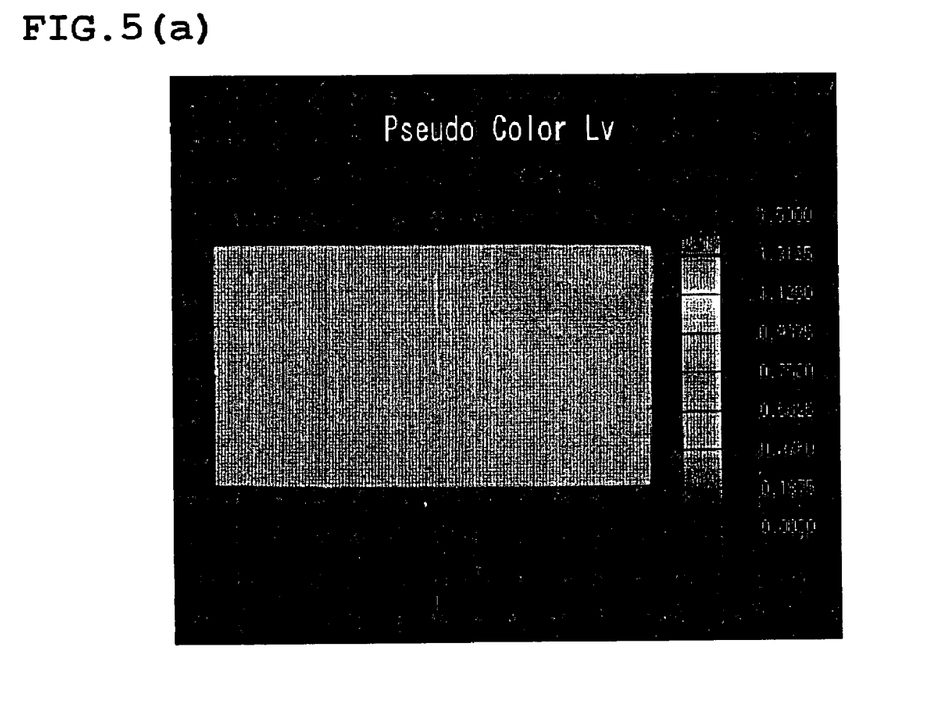
FIG. 5(a) Picture of a liquid crystal display apparatus of Example 1 of the present invention at the time of displaying a black image.

The liquid crystal display apparatus in Example 1 was stored in a thermo-hygrostat at 40° C. and an RH of 70% for 20 hours, and the backlight was lit again, revealing that the light leakage was not observed and satisfactory display uniformity was exhibited over an entire surface, as shown in FIG. 5($a$). At this time, in the case where a black image was displayed, the maximum in-plane brightness of the liquid crystal display apparatus was 1.03. In Examples 2 and 3, the light leakage was not observed, and satisfactory display uniformity was exhibited over an entire surface, in the same way as in Example 1. Furthermore, in the case where a black image was displayed, the maximum in-plane brightness of the liquid crystal display apparatus was 0.85 and 1.14, respectively.

Figure 5B:
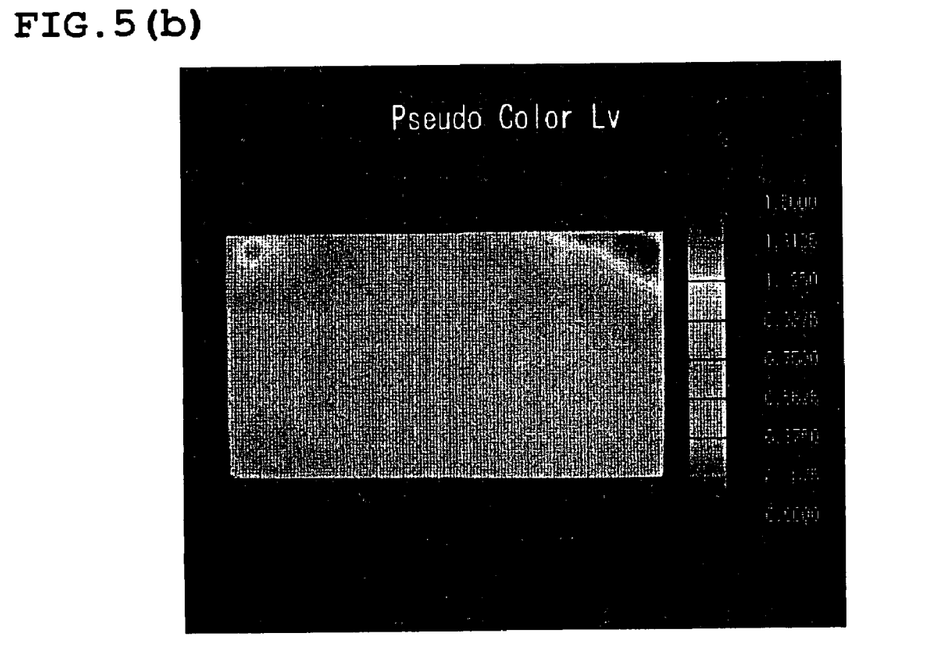
FIG. 5(b) Picture of a liquid crystal display apparatus of Comparative Example 1 at the time of displaying a black image.

On the other hand, the liquid crystal display apparatus in Comparative Example 1 was stored in a thermo-hygrostat at 40° C. and an RH of 70% for 20 hours, and the backlight was lit again, revealing that the light leakage was observed at a corner of a screen, as shown in FIG. 5($b$). At this time, in the case where a black image was displayed, the maximum in-plane brightness of the liquid crystal display apparatus was 1.46. In Comparative Example 2, the light leakage was observed similarly to Comparative Example 1. Furthermore, in the case where a black image was displayed, the maximum in-plane brightness of the liquid crystal display apparatus was 2.55.

TABLE 1

|  | First polarizing plate | Dimensional change ratio; $C_1$ [%] | Second polarizing plate | Dimensional change ratio; $C_2$ [%] | $C_1 - C_2$ [%] | Pressure-sensitive adhesive layer | Maximum in-plane brightness [cd/m$^2$] |
| --- | --- | --- | --- | --- | --- | --- | --- |
| Example 1 | B | 0.123 | C | 0.083 | 0.040 | A | 1.03 |
| Example 2 | B | 0.123 | C | 0.083 | 0.040 | B | 0.85 |
| Example 3 | A | 0.066 | E | 0.020 | 0.046 | A | 1.14 |
| Comparative Example 1 | A | 0.066 | C | 0.083 | −0.017 | A | 1.46 |
| Comparative Example 2 | A | 0.066 | D | 0.095 | −0.029 | A | 2.55 |

Figure 6A:
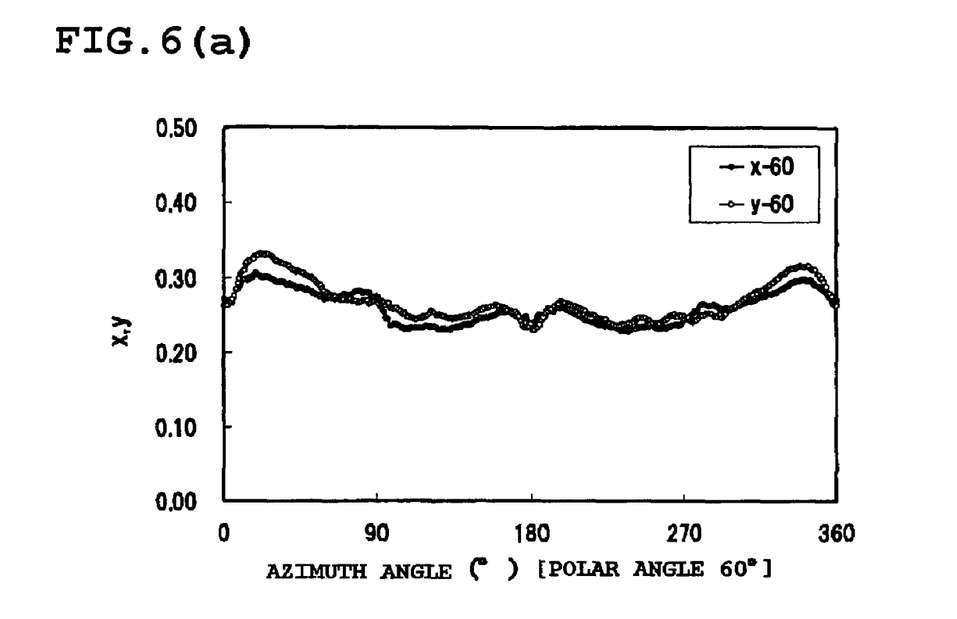
FIG. 6(a) Graph showing a measurement result of a color shift of a liquid crystal display apparatus of Example 1 of the present invention.
Figure 6B:
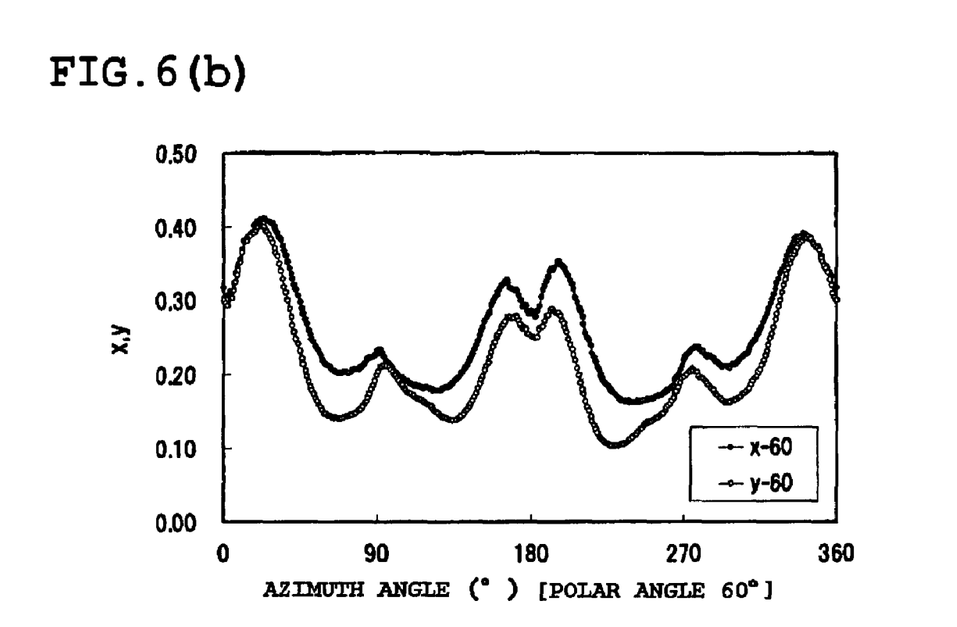
FIG. 6(b) Graph showing a measurement result of a color shift of a liquid crystal display apparatus of Reference Example 1.

FIG. 6($a$) shows the measurement results of a color shift of the liquid crystal display apparatus of Example 1, and FIG. 6($b$) shows the measurement results of a color shift of the liquid crystal display apparatus of Reference Example 1. Furthermore, Table 2 shows a color shift amount (Δxy) of each liquid crystal display apparatus. As is apparent from those, it is understood that Example 1 is more excellent than Reference Example 1 due to a smaller color shift.

TABLE 2

| | First polarizing plate/Second polarizing plate | Rth [590] of protective layer (nm) | Color coordinate | Azimuth angle 0°/ Polar angle 0° | Azimuth angle 60°/ Polar angle 60° | Δxy |
|---|---|---|---|---|---|---|
| Example 1 | A/C | 1.0 | x | 0.254 | 0.296 | 0.060 |
| | | 1.0 | y | 0.245 | 0.289 | |
| Reference Example 1 | F/G | 60 | x | 0.259 | 0.201 | 0.127 |
| | | 60 | y | 0.253 | 0.141 | |

INDUSTRIAL APPLICABILITY

The liquid crystal display apparatus of the present invention can be applied preferably to a liquid crystal television, a mobile telephone, and the like.

The invention claimed is:

1. A liquid crystal panel, comprising:
   a liquid crystal cell;
   a first polarizing plate placed on a viewer side of the liquid crystal cell; and
   a second polarizing plate placed on an opposite side of the viewer side of the liquid crystal cell,
   wherein a dimensional change ratio ($C_1$) of the first polarizing plate is larger than a dimensional change ratio ($C_2$) of the second polarizing plate.

2. A liquid crystal panel according to claim 1, wherein a difference ($\Delta C = C_1 - C_2$) between the dimensional change ratio ($C_1$) of the first polarizing plate and the dimensional change ratio ($C_2$) of the second polarizing plate is 0.02% or more.

3. A liquid crystal panel according to claim 1, wherein:
   the liquid crystal cell includes a liquid crystal layer, a first substrate placed on one side of the liquid crystal layer, and a second substrate placed on the other side of the liquid crystal layer; and
   a pixel electrode and a common electrode are formed on the first substrate or the second substrate.

4. A liquid crystal panel according to claim 1, wherein the dimensional change ratio ($C_1$) of the first polarizing plate is 0.03% to 0.20%.

5. A liquid crystal panel according to claim 1, wherein the dimensional change ratio ($C_2$) of the second polarizing plate is 0.01% to 0.18%.

6. A liquid crystal panel according to claim 1, wherein a difference ($\Delta W = W_2 - W_1$) between a moisture content ($W_2$) of the second polarizing plate and a moisture content ($W_1$) of the first polarizing plate is 0.1% to 0.5%.

7. A liquid crystal panel according to claim 1, wherein:
   the first polarizing plate includes a first polarizer, a first protective layer placed on the liquid crystal cell side of the first polarizer, and a second protective layer placed on an opposite side of the liquid crystal cell side of the first polarizer; and
   the first protective layer exhibits substantially optical isotropy.

8. A liquid crystal panel according to claim 7, further comprising a surface treatment layer on a side opposite to the first polarizer side of the second protective layer.

9. A liquid crystal panel according to claim 1, wherein:
   the second polarizing plate includes a second polarizer, a third protective layer placed on the liquid crystal cell side of the second polarizer, and a fourth protective layer placed on a side opposite to the liquid crystal cell side of the second polarizer; and
   the third protective layer exhibits substantially optical isotropy.

10. A liquid crystal panel according to claim 1, further comprising a first pressure-sensitive adhesive layer between the liquid crystal cell and the first polarizing plate.

11. A liquid crystal panel according to claim 1, further comprising a second pressure-sensitive adhesive layer between the liquid crystal cell and the second polarizing plate.

12. A liquid crystal panel according to claim 10, wherein the first pressure-sensitive adhesive layer and/or the second pressure-sensitive adhesive layer is formed by cross-linking a pressure-sensitive composition containing a (meth)acrylic polymer (A) and a peroxide (B).

13. A liquid crystal display apparatus, comprising the liquid crystal panel according to claim 1.

14. A liquid crystal panel according to claim 11, wherein the first pressure-sensitive adhesive layer and/or the second pressure-sensitive adhesive layer is formed by cross-linking a pressure-sensitive composition containing a (meth)acrylic polymer (A) and a peroxide (B).

* * * * *